US 8,887,193 B2

United States Patent
Xiong et al.

(10) Patent No.: US 8,887,193 B2
(45) Date of Patent: Nov. 11, 2014

(54) SYSTEM, METHOD, AND INFRASTRUCTURE FOR REAL-TIME LIVE STREAMING CONTENT

(75) Inventors: True Xiong, San Diego, CA (US); Leo Pedlow, Ramona, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 0 days.

(21) Appl. No.: 13/360,343

(22) Filed: Jan. 27, 2012

(65) Prior Publication Data

US 2013/0198770 A1    Aug. 1, 2013

(51) Int. Cl.
- *H04N 7/16* (2011.01)
- *H04N 5/445* (2011.01)
- *H04N 21/475* (2011.01)
- *H04N 21/45* (2011.01)

(52) U.S. Cl.
CPC ....... *H04N 21/4753* (2013.01); *H04N 5/44543* (2013.01); *H04N 7/165* (2013.01); *H04N 21/4532* (2013.01)
USPC ................ 725/30; 725/25; 380/255; 380/259

(58) Field of Classification Search
CPC .......... H04N 21/4532; H04N 21/4751; H04N 21/4753; H04N 7/163; H04N 5/44543
USPC ................ 725/25, 30; 380/255, 259
See application file for complete search history.

(56) References Cited

U.S. PATENT DOCUMENTS

| | | | |
|---|---|---|---|
| 2002/0124256 A1* | 9/2002 | Suzuka | 725/55 |
| 2007/0157281 A1* | 7/2007 | Ellis et al. | 725/134 |
| 2007/0220575 A1* | 9/2007 | Cooper et al. | 725/118 |
| 2008/0027953 A1* | 1/2008 | Morita et al. | 707/100 |
| 2008/0222673 A1* | 9/2008 | Durden et al. | 725/25 |
| 2009/0040287 A1* | 2/2009 | Miyazaki | 348/14.01 |
| 2009/0150958 A1* | 6/2009 | Jerding et al. | 725/116 |
| 2009/0158326 A1* | 6/2009 | Hunt et al. | 725/38 |
| 2009/0293088 A1* | 11/2009 | Mukerji et al. | 725/47 |
| 2009/0327462 A1* | 12/2009 | Adams et al. | 709/222 |
| 2010/0031299 A1* | 2/2010 | Harrang et al. | 725/80 |
| 2010/0071062 A1* | 3/2010 | Choyi et al. | 726/23 |
| 2010/0124907 A1* | 5/2010 | Hull et al. | 455/412.1 |
| 2010/0211995 A1* | 8/2010 | Yoshida | 726/4 |
| 2010/0235644 A1* | 9/2010 | Oxford | 713/181 |
| 2010/0235875 A1* | 9/2010 | Cedervall et al. | 725/110 |

(Continued)

OTHER PUBLICATIONS

Product literature.ViewRight(R) Web for STB.www.verimatrix.com/products/viewpoint_web_for_stb.php.downloaded Feb. 11, 2011.

(Continued)

*Primary Examiner* — Nasser Goodarzi
*Assistant Examiner* — Michael B Pierorazio
(74) *Attorney, Agent, or Firm* — Mark D. Wieczorek; Mayer & Williams PC

(57) ABSTRACT

Implementations of the system and method use an existing management server infrastructure to deliver video-on-demand or streaming content, including real-time live streaming. Existing client content playback devices, such as IPTVs, may be employed to stream content items, obtain advertisements, track user's viewing behaviors, and the like. By reusing existing client devices, there is no need for additional hardware purchases on the user side. By reusing existing management server infrastructures, capital expenses are also reduced. In such a system, a user can watch both video-on-demand and streaming audiovisual content.

27 Claims, 11 Drawing Sheets

(56) References Cited

U.S. PATENT DOCUMENTS

| | | | |
|---|---|---|---|
| 2010/0274872 A1* | 10/2010 | Harrang et al. | 709/217 |
| 2010/0324992 A1* | 12/2010 | Birch | 705/14.49 |
| 2011/0072086 A1* | 3/2011 | Newsome et al. | 709/204 |
| 2011/0126276 A1* | 5/2011 | Dykeman et al. | 726/12 |
| 2011/0191439 A1* | 8/2011 | Dazzi et al. | 709/217 |
| 2011/0191446 A1* | 8/2011 | Dazzi et al. | 709/219 |
| 2011/0231260 A1* | 9/2011 | Price | 705/14.61 |
| 2011/0314130 A1* | 12/2011 | Strasman | 709/219 |

OTHER PUBLICATIONS

Product literature.Software-based Authentication Management for HTTP Live Streaming Devices.https://na3.salesforce.com/sfc/p/30000000pkdFa4hcDI6oT)SnOPP1a2M3sFM9fo. downloaded Feb. 11, 2011.

Product literature. VCAS(tm)for IPTV-System Architecture and Key Components. https://na3.salesforce.com/sfc/p/300000000pkdBKmVVeevUsznvelQk1yQsh91o2Q.downloaded Feb. 11, 2011.

Product literature.iptvSwitch Streaming Server. http://www.sysmaster.com/products/iptv_switch.htm.downloaded Feb. 11, 2011.

"Enterprise IPTV and Video Streaming with the Blue Coast(R) ProxySG(R)." White Paper. Jun. 26, 2008, p. 3, p. 7.

"Recommender system for contextual advertising in IPTV scenarios." Proceedings of the 14th International Conference on Computer Supported Cooperative Work in Design (CSCWD2010). Apr. 14-16, 2010.Abstract and relevant text.

"A secured video streaming system." System Science and Engineering (ICSSE), 2010 International Conference. Jul. 1-3, 2010. Abstract.

* cited by examiner

Get live streaming content using apiContents API

Sample URL

Http://www.example.com/apiContents/
?service_token=FA1100020102040403040705040400010277FFFFFFFFFFFFFFFF
DA000C0301000210311003F00FB5EFF00C17E07&assetid=4141884891&rating_country=USA Sample Result <?xml version="1.0" encoding="utf-8" ?>
<response sys_ver="7.11/109">
  <header version = "01">
    <command>apiContents</command>
    <code>0</code>
  </header>
  <sony>
    <product id = "CALLISTO">
      <playlist version="1.0">
        <entry>
          <source type= "video" streams types="HTTPLS" protocol="https" metafile_types="M3U8">
            http://sonypictures.com/livestreaming/example.m3u8
          </source>
        </entry>
      </playlist>
    </product>
  </sony>
</response>

FIG. 9

Get live streaming content using apiInformation API

Sample URL

Http://www.example.com/apiInformation /
?service_token=FA11000201020404030407050404000010277FFFFFFFFFFFFFFFDA000C
030100021103110O3F00FB5EF00C17E07&assetId=414188489l&rating_country=USA Sample Result

```
<?xml version="1.0" encoding="utf-8" ?>
<response sys_ver="7.11/109">
<header version = "01">
<command>apiInformation </command>
<code>0</code>
</header>
<sony>
<product id = "CALLISTO">
<playlist version="1.0">
<entry>
<source type= "video" streams types="HTTPLS" protocol="https" metafile_types="M3U8">
http://sonypictures.com/livestreaming/example.m3u8
</source>
</entry>
</playlist>
</product>
</sony>
</response>
```

FIG. 10

SYSTEM, METHOD, AND INFRASTRUCTURE FOR REAL-TIME LIVE STREAMING CONTENT

BACKGROUND

Infrastructures exist to provide Internet video from various content providers or services. For example, the Sony Bravia® Internet Link ("BIVL") technology from Sony Corporation provides a hardware device which when coupled to a broadband Internet connection allows access to Internet video services through a management server infrastructure. Such infrastructures deliver recorded audiovisual media content such as video, music, and audio files.

Streaming refers to a delivery of media content in a constant fashion, from a transmission at a source to a reception and presentation at a receiver. For example, Internet delivery of digital content presentations to network computers is commonly streamed, as is Internet television content. Current streamed content is delivered using protocols such as HTTP, and while certain parameters are specified, e.g., when to retrieve content files, what tags are involved, etc., the same do not provide a full streaming solution. While useful for many applications, creating any new live streaming content infrastructure requires new hardware, software, and significant investment.

SUMMARY

Implementations of the system and method use an existing management server infrastructure to deliver video-on-demand or streaming content, including real-time live streaming. Existing client content playback devices, such as IPTVs, may be employed to stream content items, obtain advertisements, track user's viewing behaviors, and the like. By reusing existing client devices, there is no need for additional hardware purchases on the user side. By reusing existing management server infrastructures, capital expenses are also reduced. In such a system, a user can watch both video-on-demand and streaming audiovisual content.

Implementations of the system and method further provide a methodology and protocol to enable an IPTV device to access and obtain streaming or video-on-demand content. While the description below will primarily refer to streaming or video-on-demand content, it will be understood that systems and methods according to the principles described will be applicable to real time live streaming content as well as other such content. Moreover, the terms "content item", "content", and "asset", will generally be used interchangeably, unless the context dictates otherwise.

After a service provider's live streaming content metadata has been ingested for posting by the system, or after a third-party service provider's streaming content is available to be consumed, the methodology and protocol allow an IPTV device to access, obtain, and consume the content. In so doing, the IPTV device may indicate support for live streaming by transmitting its capabilities to a management server via a service manager module.

The system and method may employ several components and steps. The flow starts at a source of content feeding into a media encoder system. A particular implementation is described below, but it will be understood that variations of file types, protocols, or the like, may be employed according to the requirements of a given application. The media encoder system encodes an incoming audiovisual media stream, live or prerecorded, into a BIVL-compatible audiovisual stream, e.g., an MPEG2-TS stream. The encoded MPEG2-TS stream feeds into a media segmenter or slicer, which slices the stream into one or more streams or files. A next step is a generation of plain-text file, e.g., an M3U8 file, having filename extension .m3u8, that contains URIs to the sliced streams or files with filename extension .ts. When the file is generated, it may be encrypted, e.g., with AES-128 bit with CBC and VI value 8, and uploaded or placed into a web server folder where it may be accessed and retrieved by authenticated IPTV clients.

Before an IPTV client can have knowledge of the location of these files, the client may be authenticated in an appropriate fashion, e.g., through the management server infrastructure. When an authenticated IPTV client indicates its support for streaming, the same is presented with a list of streaming services. When a live streaming service is selected, a list may be provided of both live streaming and video-on-demand audiovisual media content, which may be services, categories or assets. Upon selecting a service, category or asset, or a combination, in sequence, the management server and/or service provider may perform authentication. Once authenticated, the IPTV client can decrypt the encrypted .ts file and begin live streaming content playback.

The system and method further provide a methodology and protocol to enable an IPTV device to access and obtain a streaming asset. After a service provider's streaming content metadata has been ingested into a management server infrastructure, or after a third-party service provider's streaming content is available to be consumed, the system and method provide definitions and protocols for an IPTV device to access, obtain, and consume the content. In particular, the system and method may employ a management server assets list and asset information APIs with a protocol such as HTTPS and security such as a hash value for checksum. In this way, it may integrate streaming assets into a current asset specification of a management server infrastructure such that a service provider may specify its streaming content to IPTV clients. Conversely, IPTV clients may specify their capabilities to support streaming content to a content source. In this way, IPTV clients may securely access, obtain, and playback or consume a streaming asset.

In more detail, after streaming assets are placed in a web folder as described above, the service provider may enable its streaming content to be retrieved by IPTV devices by adding definitions to API responses, such as from a management server infrastructure. The additional definitions may include, e.g., apiContents and apiInformation responses. In one implementation, it may add the following: <source> attributes streams_types="HTTPLS"; protocol="https"; and metafile_types="M3U8", which may then identify the content as, e.g., live streaming content. In addition, the <source> value may contain the URI to an .m3u8 file. In these specific implementations, in order for an IPTV client to playback the content, it should support the M3U8 metafile type and use a protocol such as HTTPS. Other types and protocols will be understood for other implementations.

Once the service provider has determined that a client supports live streaming content, it returns the correct asset list or asset. The client makes an apiContents and apiInformation call, in the above implementation, using HTTPS to the URI of the .m3u8 file to retrieve the content to be played. It is noted that such calls may be made even for non-streaming content.

A user may select content for streaming in any number of ways, including using a standard remote control in combination with the content playback device or using a second display, the former being associated with a user account and the latter optionally so associated. The use of second display devices in such contexts has certain benefits because the same provides complementary functionality to the IPTV, but generally does not require additional investment by the user because the same make use of a device, e.g., a smartphone, laptop computer, tablet computer, a desktop, an Internet appliance, etc., which most users already have in their possession. Additional details about such second displays and their interactions with content playback devices, e.g., through proxy servers and otherwise, may be seen from Applicants' co-pending U.S. patent application Ser. No. 13/077,181, filed Mar. 31, 2011, entitled "PERSONALIZED SECOND DISPLAY BROWSING EXPERIENCE DUE TO MULTIPLE SESSION FEATURE", owned by the assignee of the present application and incorporated herein by reference in its entirety.

Where second displays are employed, the same may include any device that can run an application that communicates with a content playback device, including, but not limited to, personal computers, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the second display application.

In a general method, including use of a second display, a user has a user account with a source or clearinghouse of services. Here, the source or clearinghouse is represented as a management server, but it should be understood that the user account may be with a service provider directly. The management server communicates with at least one content server (generally associated with the service provider) such that the content server provides content items such as streaming assets for presentation or access at the content playback device. The user account has information stored thereon related to what content playback devices are associated with the user account. When a user logs on, they may see this list of content playback devices and may choose a particular content playback device. Once a content playback device has been chosen, a list of services may be displayed from which the user may choose. From a chosen service, a user may select a content item for streaming viewing, undergoing an affiliation or authentication step if required by the service. Additional details may be found in the application incorporated by reference above.

In one aspect, the invention is directed to a method to enable streaming, live streaming, and/or video-on-demand on a management server infrastructure, including: receiving a login and authentication request from a device having authentication credentials; upon successful authentication, establishing a streaming session; providing a service list to the device; receiving a request for content from the service list that is streamed or video-on-demand; and providing a URI to the device, the URI providing a location from which the device may receive the content, the location associated with a service provider or content delivery network.

Implementations of the method may include one or more of the following. The method may further include delivering a media encoder and segmenting module to the service provider or content delivery network. The authentication credential may be associated with a user account, and the method may further include delivering an advertisement to the device, a choice of advertisement at least partially based on data in the user account. The authentication credential may be associated with a user account, and the method may further include delivering a recommendation of an additional content item to the device, the recommendation at least partially based on data in the user account. The method may further include providing an asset list to the device, the asset list corresponding to a user selection from the provided service list, and where the receiving a request for content from the service list may include receiving a selection of an asset from the asset list. The method may further include determining if a content playback device is operating in a malicious manner by determining if multiple occurrences of the receiving a request for content have occurred more than a predetermined number of times in a predetermined time period. The providing a URI may include providing a proxy URI to the content playback device, the proxy URI convertible to an actual URI only at the content delivery network, such that the actual location of a URI file is hidden to the content playback device. The method may further include receiving data about a technical capability of the content playback device, and the method may further include filtering the service list based on the technical capability.

In another aspect, the invention is directed towards a non-transitory computer-readable medium, including instructions for causing a computing device to implement the above method.

In another aspect, the invention is directed towards a system for streaming, live streaming, and/or video-on-demand on a management server infrastructure, including a management module, implemented on one or more servers, and coupled to a content playback device and a service provider, where the management module includes: a service manager module, the service manager module for receiving a login request from the content playback device and for establishing a session upon successful authentication, the session including transmitting at least one technical specification of the content playback device to the service manager module; a service module for providing a list of services to the content playback device upon receipt of a service list request from the content playback device, the service module further for receiving a selection of a service from the list from the content playback device; and an index file module for providing a URI of an index file to the content playback device, the index file corresponding to the service selected on the content playback device, the URI allowing the content playback device to access an index file from a service provider or content delivery network.

Implementations of the method may include one or more of the following.

The system may further include an advertising module, the advertising module for providing advertising to the content playback device at least partially based on data associated with a user account associated with the content playback device. The system may further include a recommendation module, the recommendation module for providing recommendations of content items to the content playback device at least partially based on data associated with a user account associated with the content playback device. The system may further include an asset list module, the asset list module for providing an asset list corresponding to the service selected on the content playback device, the asset list module further for receiving a selection of an asset from the list from the content playback device, and where the URI of an index file provided to the content playback device is a URI of an index file corresponding to the selected asset. The system may further include a media encoder and segmenter module, the media encoder and segmenter module for receiving media from a content source and encoding and segmenting the media such that the media is represented by an index file and a plurality of transport stream files. The system may further include a media encoder and segmenter provisioning module for providing the media encoder and segmenter module to a service provider or content delivery network. The system may further include a filter module to filter the provided service list based on the technical specification of the content playback device, the technical specification at least including an ability of the content playback device to support video-on-demand or streaming content. The system may further include a proxy module, the proxy module communicating with the content delivery network or service provider such that the index file module provides a proxy URI to the content playback device, the proxy URI convertible to an actual URI by the content delivery network or service provider when received from the content playback device. The system may further include a denial of service module, the denial of service module detecting if a number of attempts have been made to access the provided URI greater than a predetermined threshold number within a predetermined period of time.

In another aspect, the invention is directed towards a method for making streaming or video-on-demand content available to a content playback device through a management server, including: for an asset provided or to-be-provided for streaming or video-on-demand, providing at least one definition corresponding to a source, a protocol, and a metafile type, where the source contains a URI to an index file; in a response to a request for a streamed or video-on-demand asset from a content playback device, determining if the content playback device supports streaming or video-on-demand; and if the content playback device is determined to support streaming or video-on-demand, returning data sufficient to enable the content playback device to make a call to the URI to retrieve the asset to be played.

Implementations of the invention may include one or more of the following. The determining if the content playback device supports streaming or video-on-demand may include receiving a TV_ID from the content playback device during an authentication procedure. The protocol may be an HTTP protocol and the metafile type may be M3U8. The data may be returned following receipt of an apiContents API call or apiInformation API call.

In another aspect, the invention is directed towards a non-transitory computer-readable medium, including instructions for causing a computing device to implement the above method.

Advantages of certain implementations of the system and method may include one or more of the following. Existing management server infrastructures may be reused to deliver streaming content in a cost-efficient manner, as well as providing security, content management, and client management. Existing IPTV clients may be employed to stream content, obtain advertisements, and track user's viewing behaviors. Users may be enabled to view both video-on-demand and live streaming audiovisual content. The system and method are highly scalable. The system and method may be conveniently employed to deliver live content to existing content playback devices from sources such as concert venues, sporting events, movie events, and the like, thus adding tremendous value to existing customers as well as being another source of revenue generation to the operator of a management server infrastructure. The system and method may further be employed to deliver advertising, opening advertising revenue streams from client companies and third-party advertisers. The system and method may allow the delivery of ads that are tailored to a user's live streaming history and behaviors. The system and method may provide secure authentication for IPTV clients and may validate clients using parameters such as TV_ID and user token. The system and method may provide for revocation and rejection of potential malicious IPTV clients. The system and method may provide for the hiding of URIs associated with M3U8 files making the location of streaming content items unknown to potential attackers who wish to perform denial of service attacks. The system and method may filter streaming content services based on what client capabilities have been noted, and may present streaming contents only to supported clients. The system and method allow a service provider to specify its streaming content such that a content playback device may access, obtain, and play the same. In this way, the service provider may integrate streaming content information into an existing management server infrastructure in a convenient fashion.

Other advantages will be apparent from the description that follows, including the figures and claims.

BRIEF DESCRIPTION OF THE DRAWINGS

Like reference numerals denote like elements throughout.

FIG. 9 is a code sample illustrating an exemplary API call according to a further aspect of the present principles, the method for retrieving streaming and/or video-on-demand content.

FIG. 10 is a code sample illustrating an exemplary API call according to a further aspect of the present principles, the method for retrieving streaming and/or video-on-demand content.

FIG. 11 illustrates an exemplary computing environment, e.g., that of the disclosed IPTV or client device, management server, second display, or the like.

DETAILED DESCRIPTION

Figure 1:
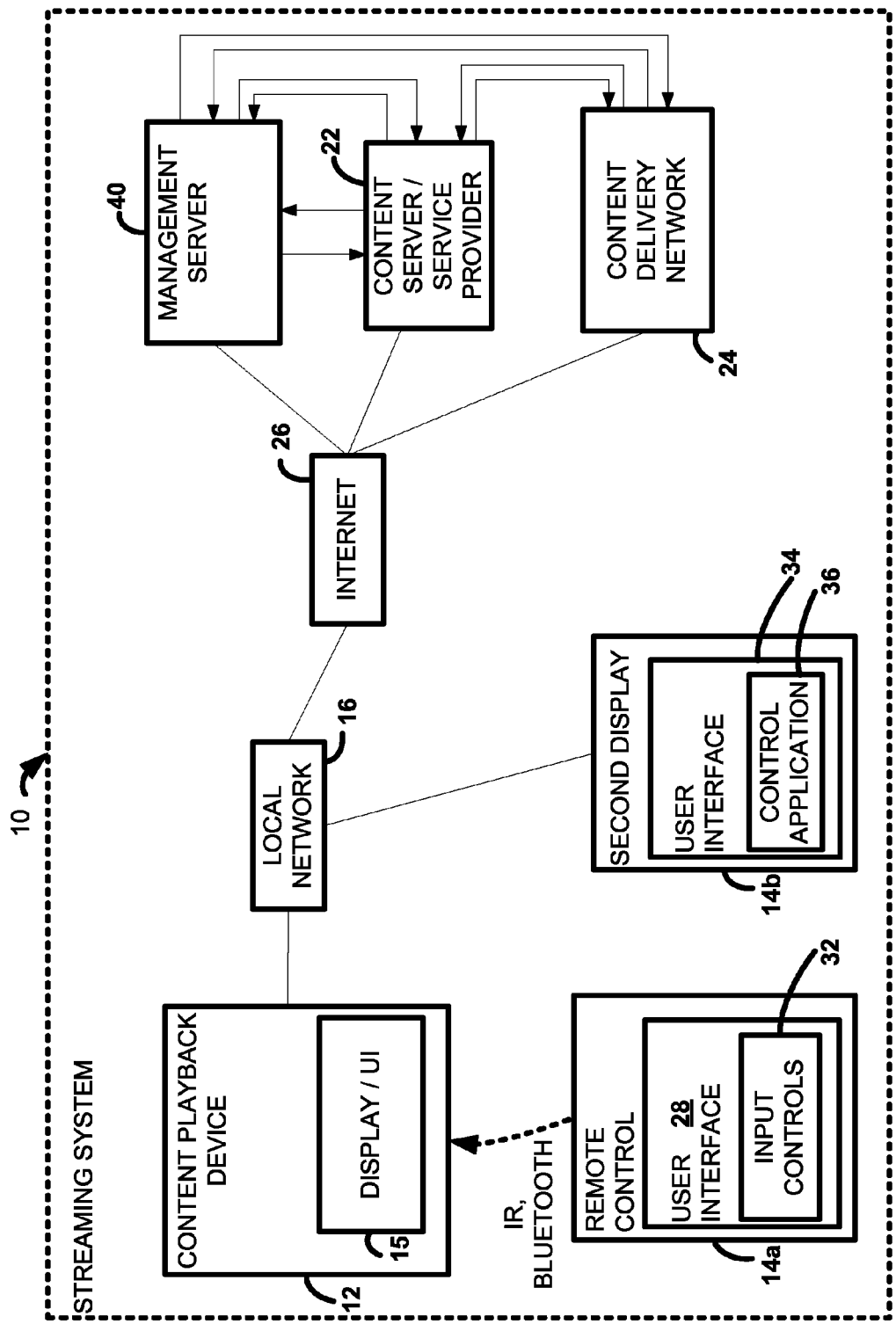
FIG. 1 is a block diagram of an exemplary system in accordance with an aspect of the present principles, illustrating a management server and content delivery network which may be employed to deliver streaming or video-on-demand content to a content playback device.

Referring to FIG. 1, a system 10 is shown including a content playback device 12 coupled to a local network 16, which may be wired, wireless, or a combination of both. Also coupled to the local network 16 are one or more remote controls 14a, which may be of any type capable of providing input through a user interface 28 having input controls 32 to the content playback device 12 in order to control a user interface 15 having various menu options. Besides the remote control 14a, a second display 14b may also be employed to control content playback devices on the local network 16. The second display 14b may employ a user interface 34 running a control application 36. The second display 14b may in some cases be a laptop, tablet, handheld computer, or other Internet appliance, or may include a mobile device such as a smart phone, which may be directly connected to the Internet 26 or to the local network 16, or both. Other types of second displays will also be understood, including desktop computers or the like. The control application 36 may operate the content playback device through the local network 16 either as part of the local network or even from a location external to the local network.

A number of servers may be accessed by the content playback device 12 through the local network 16 and the Internet 26, including a management server 40 and one or more content servers 22 corresponding to service providers (only one is shown in FIG. 1). The servers may communicate with a content delivery network 24 to enable content items to be delivered to the content playback device 12.

With the system 10 of FIG. 1, the user is provided with a convenient and flexible way to select content items for streaming.

Figure 2:
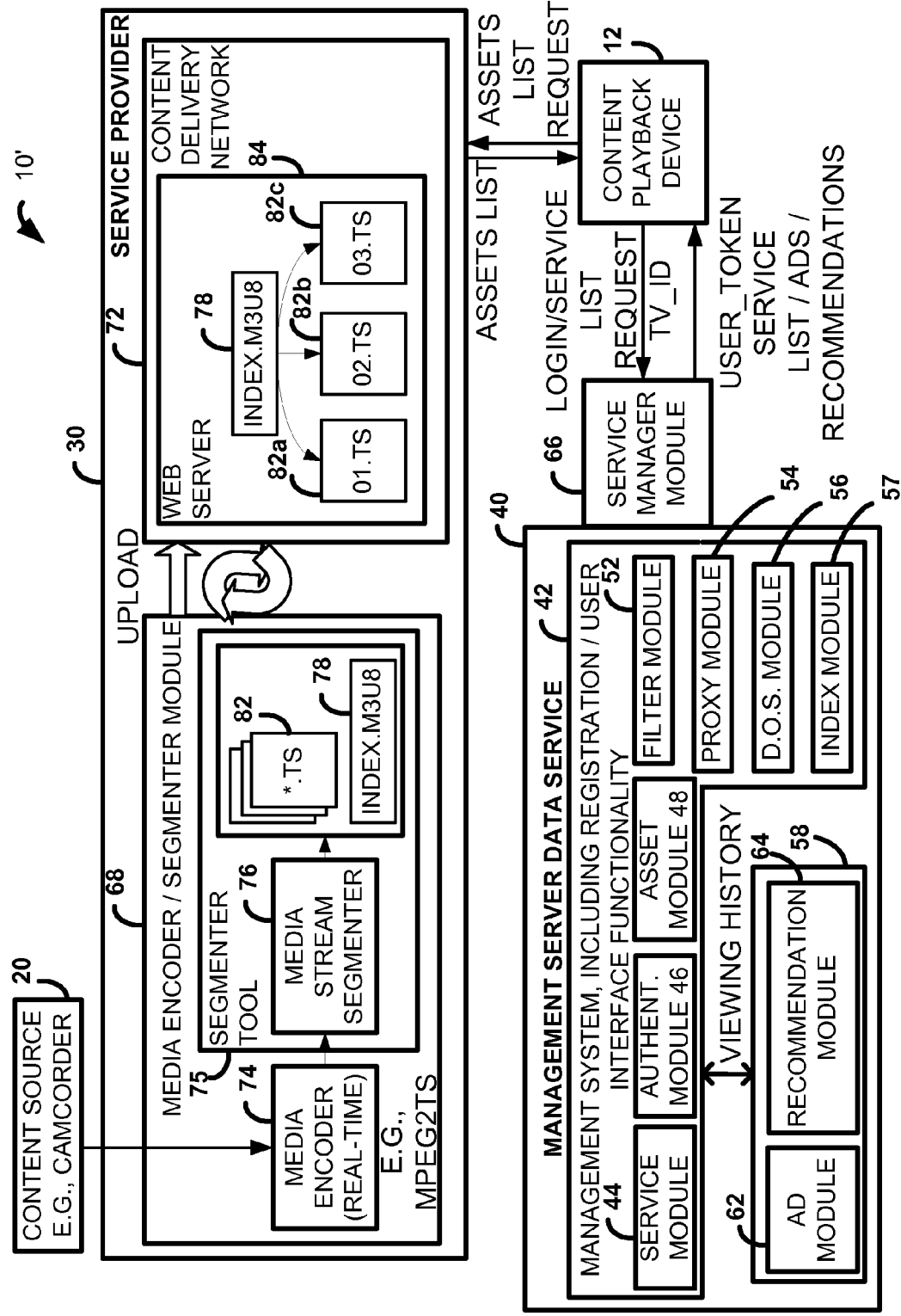
FIG. 2 is a block diagram of a more detailed exemplary system in accordance with an aspect of the present principles, illustrating a management server and content delivery network which may be employed to deliver streaming for video-on-demand content to a content playback device.

A more detailed implementation of the system is illustrated in FIG. 2, in which a system 10' is shown in which the content playback device 12 is coupled to a management server 40 through a service manager module 66. The content playback device is also coupled to a service provider 30. The coupling of the content playback device 12 to the management server 40 and the service provider 30 is generally through the local network 16 and Internet 26.

The service manager module 66 provides the initial gateway for content between the content playback device and the management server 40. When the content playback device 12 requests a login to the management server 40, it provides a TV_ID to the service manager module 66. Using the TV_ID the management server 40 can determine the client device capabilities, e.g., in terms of streaming. The service manager module 66 in turn returns a user token to the content playback device 12. Authentication by the service manager module 66 allows the content playback device to access the management server infrastructure and see available services. Thus, following such login, the content playback device may request a list of available services from the management server, and such list may be returned to the content playback device. The content playback device 12 may then request a service, an asset within the service, or the like. Generally access of a particular service and the assets thereof will require affiliation and/or authentication with that service.

The management server 40 provides a data service with a number of functions. For example, an authentication module 46 may be provided to allow the authentication of client devices such as content playback devices, e.g., IPTVs, if such is not provided by the service manager module. A service module 44 may be employed to provide a service list to the content playback device 12. It will be noted that such service lists, as well as asset lists and other user interface modules, may be provided to a second display as well as to a content playback device 12. However, such second displays will generally use the authentication credentials of the content playback device 12 to access the actual streaming content items, unless the same are provided free of authentication.

An asset module 48 may be provided to deliver a list of assets corresponding to a service as may be provided by the service module 44. It is noted that in some cases user selection of a service may lead to delivery of a streaming asset, while in other cases, user selection of a service leads to a list of assets or categories of assets for selection. In implementations described here, selection of the service may lead to presentation of a grid of available content items, e.g., organized by whether they are video-on-demand, real-time live streaming, upcoming in the future, or the like.

A filter module 52 may be provided to filter assets or services from being delivered to a content playback device, based on a number of factors. For example, one such filter is if a content playback device can support the service or asset. Another filter is if the content playback device is affiliated with the service. If not, such services may be filtered out. Other factors will also be understood.

A proxy module 54 may be provided to serve a proxy function with respect to URIs of content items which are sent to a requesting content playback device. As will be explained in greater detail below, URIs provided to the content playback device may be proxy URI's, which are translated to an actual URI by a service provider or content delivery network. In this way, the actual location of content files is hidden from potential unauthorized access. Another module illustrated in FIG. 2 is a D.O.S. module, or "denial of service" module 56. The denial of service module 56 may be employed to test if a content playback device 12 is acting in a malicious manner. For example, the denial of service module 56 may test if a large number of accesses are indicative of malicious activity, or if a TV_ID has been counterfeited. In general, such activity may be flagged if a number of accesses exceed a predetermined threshold number over a predetermined period of time.

A viewing or transaction history associated with the user account may be employed to personalize management server functionality. Such personalization modules are illustrated in element 58. In one case, an advertising module 62 may be employed to tailor ads delivered to a user based on user tastes as determined by a number of factors, these factors and methods described in U.S. patent application Ser. No. 13/313,740, filed Dec. 7, 2011, entitled "METHOD AND SYSTEM FOR ADVERTISEMENT CHOICES USING A SECOND DISPLAY DURING CONTENT PLAYBACK", owned by the assignee of the present application and incorporated by reference herein in its entirety. A recommendation module 64 may further be employed to provide recommendations of additional content items, or advertisements, based on a user viewing history, a viewing history of affiliated users such as may be listed on a friends list, or other such factors.

Once the management server 40 has authenticated the client device in an appropriate manner, the management server may provide the content playback device 12 with a URI to access streaming or video-on-demand content from a service provider 30, generally by providing a URI to an index file via an index module 57.

The service provider 30 is illustrated with a number of components, and these components may be distributed in a number of ways, the distribution in FIG. 2 being merely one of these ways. The service provider 30 may provide its streamed or video-on-demand content by way of a content delivery network 72 which hosts files on a web server 84. Each such file typically includes an index file, which may be in one implementation in the format .m3u8, and the index file may provide a URI to a number of transport stream files 82a-82c, e.g., 01.ts, 02.ts, 03.ts, and so on.

The streamed content files may be provided to the web server in this fashion or may be created using a media encoder and segmenter module 68. The media encoder and segmenter module 68 is illustrated as being part of the service provider 30, but it will be understood that the same may be hosted entirely separately.

As shown in the figure, generally a flow starts at a source of content 20, e.g., a camcorder file or other such audiovisual file, feeding into the media encoder and segmenter module 68. A media encoder 74 encodes an incoming audiovisual media stream, e.g., live or prerecorded, into an encoded format such as MPEG2-TS. The encoded stream feeds into a segmenter module 75, which at a segmenter 76 slices the stream into one or more streams or files, e.g., which durations are arbitrary but are generally of equal length for better performance. An index file is then generated which contain URIs to the sliced streams or files. In the figure, the index file is an M3U8 file with filename extension ".m3u8", and the same contains URIs to files with filename extension ".ts".

When the file is generated, it may be encrypted, e.g., with AES-128 bit security with CBC and VI value 8, uploaded or placed into a web server folder as noted above where the same may be accessed and retrieved by authenticated IPTV clients.

Before an IPTV client can be provided with knowledge of the location of the files, the client is authenticated by the service manager module 66. Authenticated IPTV clients may indicate their support for streaming content and may be presented with services and/or assets as described above. When a streaming service is selected, a mixed list of both live streaming and video-on-demand audiovisual content assets may be displayed. Upon selection of an asset, the service provider and the management server will generally perform authentication for the selected service or asset as required. As will be described below, authentication may also be provided by a hosting server. For example, if a service requires a separation step of affiliating or of verifying affiliation, the affiliation may be performed along with any needed authentication of the client device. Once authenticated, the IPTV client can decrypt the encrypted .ts files and begin streaming content playback.

Figure 3:
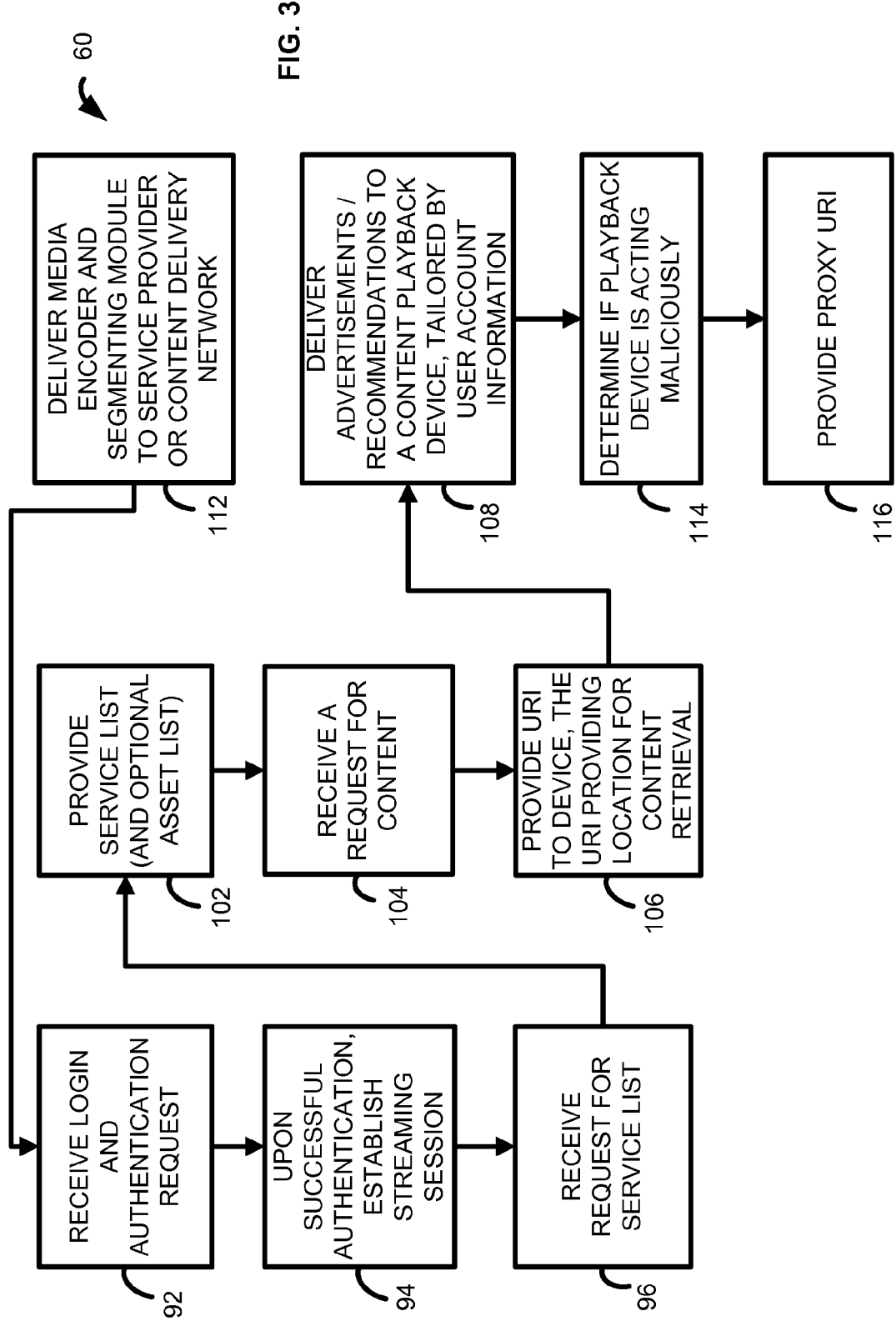
FIG. 3 is a flowchart illustrating an exemplary method according to another aspect of the present principles, the method for delivering streaming and/or video-on-demand content.

A flowchart 60 of one method according to the present principles is illustrated in FIG. 3. A first step is that a management server receives a login and authentication request from a content playback device (step 92). The next step is that, upon successful authentication, a streaming session is established between the two components (step 94). In this streaming session a number of aspects may be communicated, according to the principles described here. For example, the client is described to the management server, e.g., whether streaming is supported by the client. The management server may mandate a particular type of security protocol. A transport protocol may also be chosen, e.g., HTTP. It will be understood that other sorts of protocols may also be employed. The aspects communicated by the management server and content playback device will generally go beyond such basics as mere frequency of retrieval of transport stream files, what tags are involved, or the like. Generally the parameters communicated will include those pertaining to content treatment or security, e.g., AES, Shell-3, TLS1.1, link protection, encryption, hashing, keys, etc.

A next step is that the management server receives a request for a list of services (96) from the content playback device, or such may be set to be a default action. As noted, the services themselves may, when selected, lead to streaming directly. In other cases, selection of a service from the list leads to display of a corresponding set of assets provided by the service. A grid of available content may also be presented, e.g., organized by whether the content items are video-on-demand, real-time live streaming, upcoming in the future, or the like. In any case, in response to the request, the service list and optional asset list may be provided to a content playback device (step 102). A client device then requests an asset or content item, and the request is received at the server (step 104). A URI corresponding to the selected asset is provided to the client device, the URI providing a network location for retrieval of the appropriate streaming files (step 106). Advertisements or recommendations may then be sent along with the streaming files, tailored by information in the user account as described above (step 108). If the content playback device is acting in a way that indicates a malicious attack on the system, such may be determined and appropriate actions taken (step 114).

In some implementations, a proxy URI may be provided to hide the actual network location of streaming files (step 116). In other words, the URI is set to be some network location xxx.xxx.xxx.xxx, and the same is that with which the client approaches the content delivery network. The service provider or content delivery network then employs a lookup table where xxx.xxx.xxx.xxx is translated to the real content URI. That is, the information from the client is mapped to a real URI. A hacker of the client system could only obtain xxx.xxx.xxx.xxx, and with just that URI, the content delivery network will not deliver the actual URI. It will be understood that variations of the above are also possible, including where the network location xxx.xxx.xxx.xxx is replaced with a relative location within a namespace.

FIG. 3 also indicates that an initial step may be undertaken by the management server of delivering a media encoder and segmenting module to the service provider or content delivery network (step 112). In this way, prior to any requests for content being received, live streaming content may be formatted in an appropriate manner for transport to IPTV client devices.

It will be understood by one of ordinary skill in the art that not all steps described above (or in any of the flowcharts below) need be undertaken in any particular implementation, and the order of steps may vary to a certain extent as well.

Figure 4:
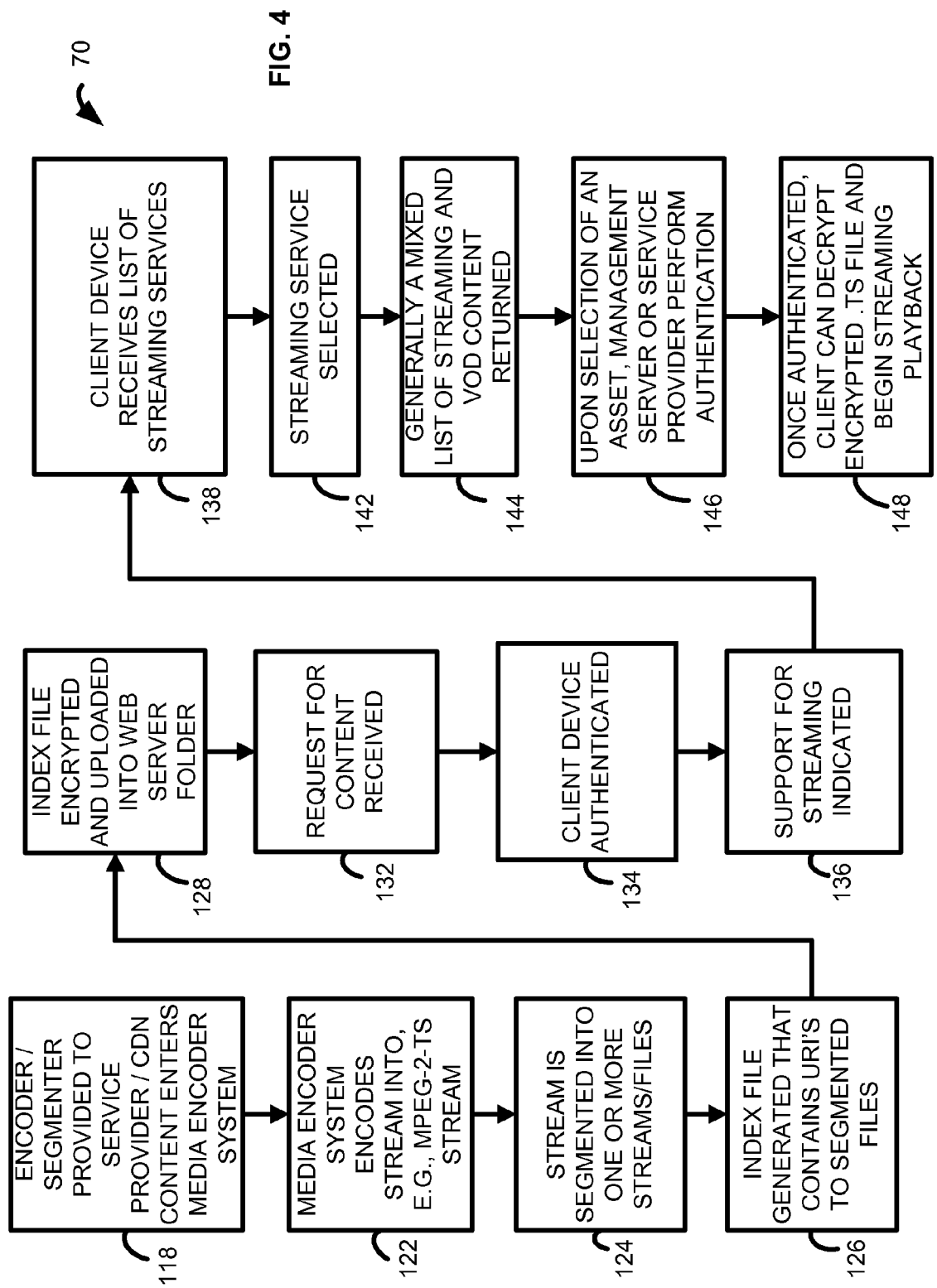
FIG. 4 is a flowchart illustrating an exemplary method according to a further aspect of the present principles, the method for delivering streaming and/or video-on-demand content.

FIG. 4 illustrates a flowchart 74 of a related implementation according to the principles described here. In a first step, an encoder or segmenter module is provided to a service provider or content delivery network, and content enters the media encoder system (step 118). The content may be, e.g., a live stream, or may include prerecorded content. A media encoder system encodes the stream into, e.g., an MPEG-2 TS stream (step 122). The stream is segmented into one or more streams or files. An index file is generated that contains URIs to the segmented files (step 126). The index file may be encrypted and uploaded into a web server folder (step 128).

A request for content is received from a client device (step 132). The client device is authenticated (step 134), and support for streaming is indicated (step 136). The client device receives the list of streaming services (step 138), and a service is selected (step 142). An optional asset list and selection may then occur (not shown).

Data which is provided to the content playback device generally includes a mixed list of streaming and video-on-demand content (step 144). While such display is described in greater detail below, it is noted here that the list may include prior content, now stored and provided as video-on-demand, live streaming content, as well as indications of streaming content accessible in the future. In many cases, a service provider may mandate that certain streaming assets are only available in one form or another, e.g., only available as live streaming content or only available as video on demand. In the same way, pricing and subscription models may differ for the respective types.

Upon selection of an asset, the management server or service provider generally performs authentication for the given service and/or asset (step 146), and upon authentication, the client is provided with the needed URI and can decrypt the encrypted .ts file and begin streaming the asset (step 148).

Figure 5:
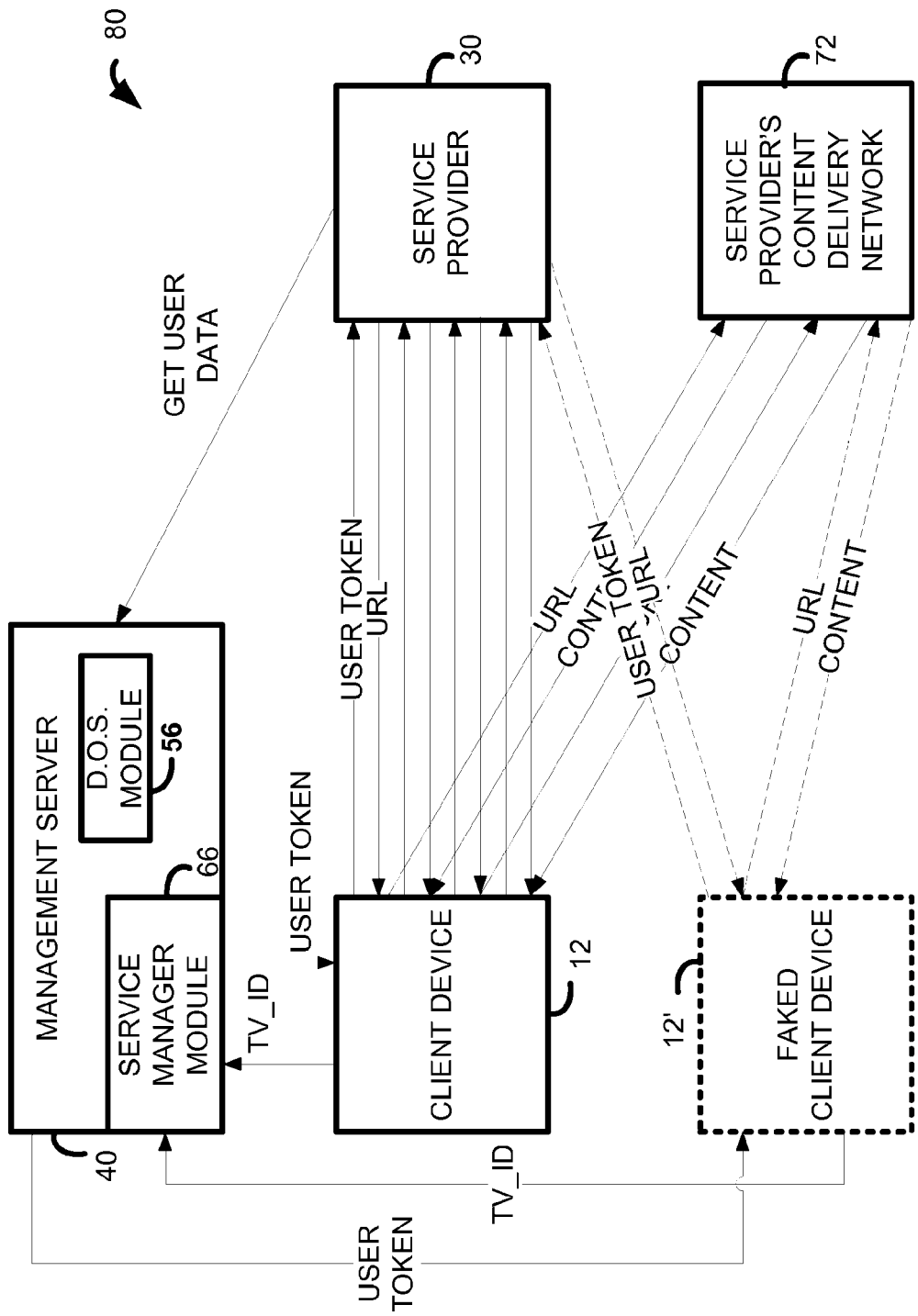
FIG. 5 is a block diagram of another exemplary system in accordance with an aspect of the present principles, illustrating ways in which the system may detect and treat malicious or denial-of-service activity from a content playback device.
Figure 6:
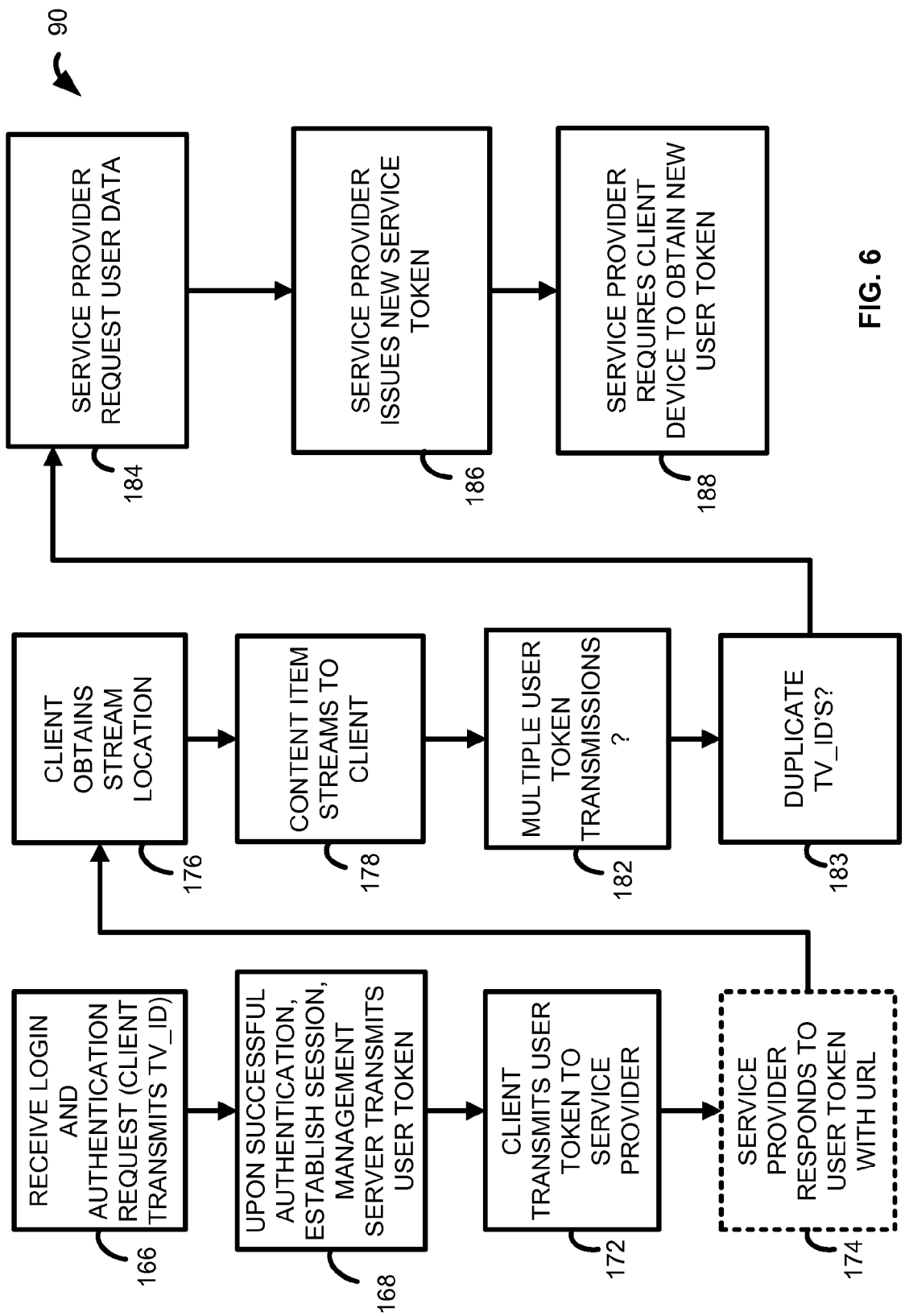
FIG. 6 is a flowchart illustrating an exemplary method according to a further aspect of the present principles, the method for detecting malicious or denial-of-service activity during retrieval of streaming and/or video-on-demand content.

As noted above, a denial of service module 56 may be employed in a method of detecting malicious conduct by a client device 12, and FIGS. 5 and 6 provide an illustration of such a system 80. In FIG. 5, the management server 40 is shown in partial view with its denial of service module 56 and service manager module 66. A client device 12 is illustrated accessing the management server and service provider 30, as well as receiving content from a service provider's content delivery network 72. It will be understood that a content delivery network 72 may be associated with one or with several service providers. The description of FIG. 5 is made in conjunction with the description of the flowchart 90 of FIG. 6.

Upon presentation of a TV_ID, associated with the electronic serial number or "ESN", by client device 12 to the service manager module 66 (step 166), a user token is generated and sent to the client device (step 168). The user token is presented to a service provider 30 (step 172) and the service provider responds by issuing the service token. After selection of a service and asset, a URI is delivered back to the client device 12 (step 174). The client device 12 then retrieves the stream from the URI, e.g., by reading the M3U8 file and obtaining stream locations therefrom (step 176). The content items are then streamed to the client (step 178).

However, certain activity by the client device 12 may be consistent with malicious activity, and the same may be flagged and counter actions taken. For example, if the client device 12 repeatedly asserts the same user token to the service provider 30, resulting in a large number of URIs being returned (step 182), such activity may be noted as suspicious by the service provider. The uniqueness of the user token allows the service provider to identify the client device as the user token includes the ESN. Besides the number of user token assertions, the management server may also note if a duplicate TV_ID has been presented (step 183). In other words, if the authentic client device were somehow hacked, its TV_ID may be stolen or counterfeit and presented again to the management server, shown in the figure as "faked" client device 12'. The management server may then note such a duplicate TV_ID and flag the same.

A number of actions may be taken. For example, a separate communication may be made by the service provider 30 to the management server 40 to assert a "get user data" call (step 184), to obtain more information about the potentially malicious user. Following this, the management server may update its own database to be alert for suspicious activity from the user account. In addition, the service provider may request that a new user token be obtained (step 188), which would require the client device to make a new request for the same from the management server. If the management server continues to see such new requests, the management server can again flag the user account, and again the perpetrators of the malicious attack can be isolated by analysis of any of the user tokens provided. As a further counteraction, if the service provider 30 suspects malicious activity, the service provider may issue a new service token (step 186), which may then also be employed for identification of a perpetrator.

After a service provider's streaming or video-on-demand content has been made available to be consumed, e.g., by being placed into web folders with an appropriate index file and transport stream files, a client content playback device, such as an IPTV, may be enabled to access, obtain, and consume the content. To provide this capability, definitions may be provided to specify streaming content as well as the client device's support for such content. It is noted that such definitions may apply to any content, and not just streaming content. It is also noted that such definitions may provide features beyond just how a client and server interacts with a piece of content. Such may also provide features on how content items are presented on the client. In such a presentation, both an asset list may be provided as well as asset information. In an asset list, it may be indicated if the content item is live or video-on-demand, and thus can be presented on the above-noted grids accordingly. Moreover, when an asset is selected, additional information may be provided to the user. Such user interface grids are discussed in co-pending U.S. patent application Ser. No. 13/360,295, filed on even date herewith, entitled "SYSTEM, METHOD, AND INFRASTRUCTURE FOR REAL-TIME LIVE STREAMING CONTENT", owned by the assignee of the present application and herein incorporated by reference in its entirety.

Figure 7:
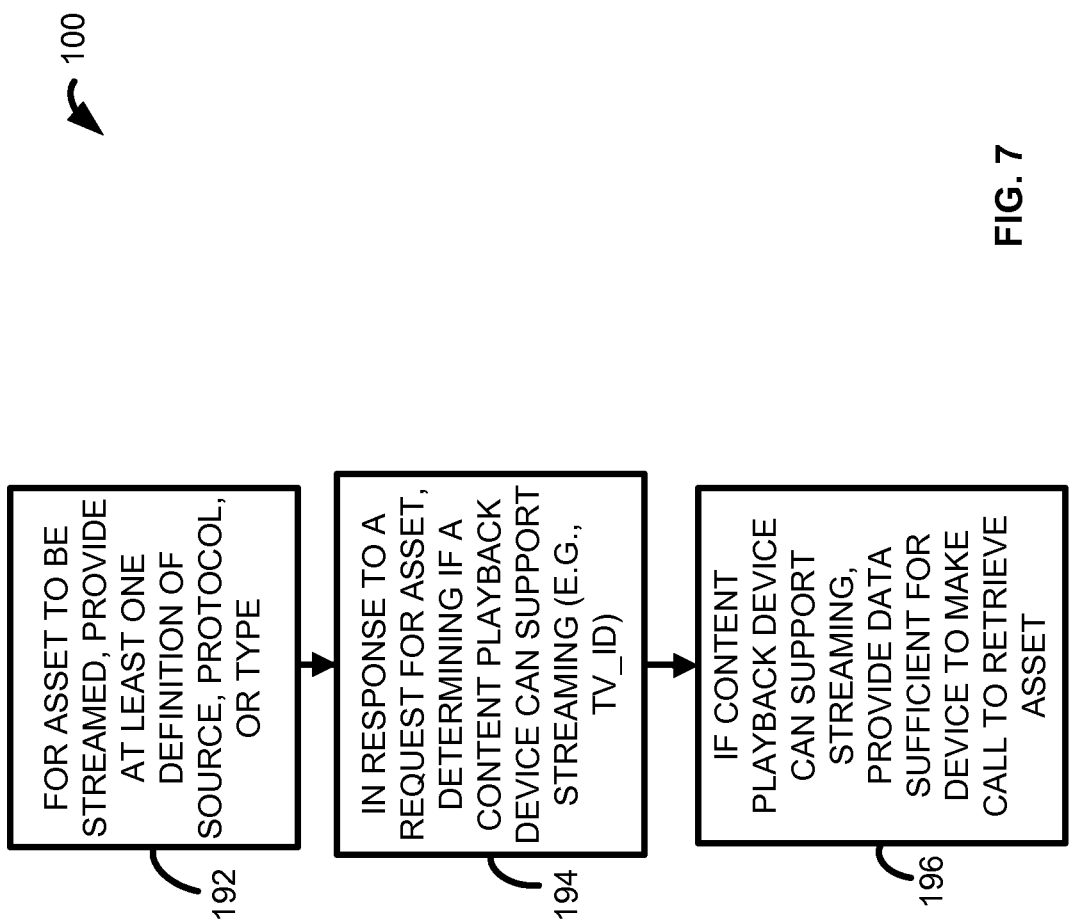
FIG. 7 is a flowchart illustrating an exemplary method according to a further aspect of the present principles, the method for retrieving streaming and/or video-on-demand content.

The flowchart 100 of FIG. 7 illustrates one way in which streaming content may be specified. In particular, for each asset to be streamed, the service provider needs to provide at least one definition of source, protocol, and type (step 192). For example, instead of merely specifying and delivering content using a protocol such as HTTP and a particular file type, the system may provide a full system of features from the management server including use of an asset list API, asset information API, along with a protocol such as HTTPS and security such as a hash value or checksum. In this way, an existing asset specification may be integrated with streaming assets, including live streaming assets.

The service provider may then make its streaming content available to content playback devices by adding definitions to management server API responses. Exemplary such definitions are illustrated in FIGS. 9 and 10 for apiContent and apiInformation API responses. In these exemplary definitions, <source> attributes streams_types="HTTPLS"; protocol="https"; and metafile_types="M3U8" are employed to identify the content as, e.g., live streaming content. In addition, the <source> value may contain the URI to an .m3u8 file. It is stressed that these particular protocols and file types are merely exemplary and that any such protocol and file type may be employed according to the requirements of the application.

In response to a request for an asset, the ability of the content playback device to support streaming may be determined, e.g., by analysis of a TV_ID (step 194). Such abilities may be specified at the asset level, which allows specification of where the content should appear in, e.g., a user interface menu, in contrast to specifying at higher levels, which allows less delineation or distinguishing of content. In the example above, in order for a client device to stream such content, the same must support the M3U8 metafile type as well as use the HTTPS protocol.

Once the service provider has determined that the client supports streaming content, the service provider returns sufficient information to allow the device to make a call to retrieve the asset (step 196). In other words, the service provider returns the correct assets list or asset. In the example above, the client makes a apiContent or apiInformation API call using HTTP to the URI of the .m3u8 file to retrieve content to be played.

Figure 8:
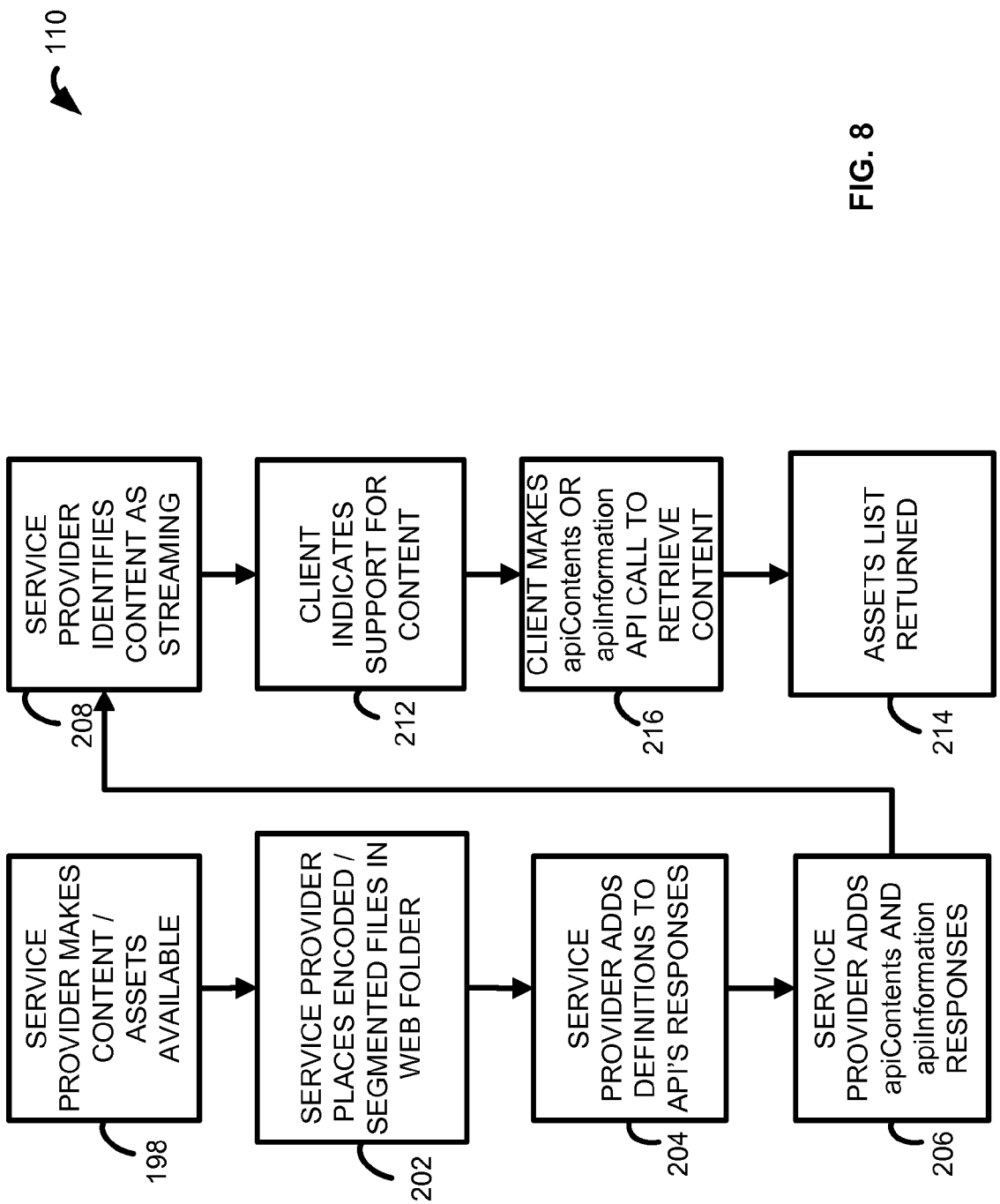
FIG. 8 is a flowchart illustrating an exemplary method according to a further aspect of the present principles, the method for retrieving streaming and/or video-on-demand content.

FIG. 8 illustrates a more detailed flowchart 110 in which the general procedure is detailed. A first step is that a service provider makes content or assets available (step 198). In so doing, the service provider places the encoded and segmented files in an appropriate web folder (step 202). Such a web folder may be at the service provider or within a content delivery network or in some other network accessible location. The service provider then adds definitions to API responses to management server calls (step 204). Of course, the definitions may have been added as an initial matter before any content was in place or accessible. For example, the service provider may add responses to calls such as apiContent and apiInformation (step 206). In this way, the service provider identifies the content as streaming content (step 208). Specific definitions may be included as detailed above.

The client device then indicates its support for streaming content (step 212). Such may be part of the initial identification login and authentication procedure for client devices with the management server. Upon request, such as when a client makes a apiContent API call to retrieve content (step 216), an assets list may be returned (step 214). Exemplary apiContent and apiInformation API calls are illustrated in FIGS. 9 and 10, as code sections 120 and 130, respectively.

Details of certain components will now be described.

The content playback device 12 can take many forms, and multiple content playback devices can be coupled to and selected from within a given local network. Exemplary content playback devices may include, e.g., an IPTV, a digital TV, a digital sound system, a digital entertainment system, a digital video recorder, a video disc player, a combination of these, or any number of other electronic devices addressable by a user on the local network 16 and capable of delivering an ad over the Internet. The same may also include more traditional video and audio systems that have been appropriately configured for connectivity. For the sake of simplicity, in this specification, the content playback device 12 will generally be exemplified by an IPTV, in which case the same will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on various memories to undertake present principles. The processor can receive user input signals from various input devices including a second display, a remote control device, a point-and-click device such as a mouse, a keypad, etc. A TV tuner may be provided in some implementations, particularly when the content playback device 12 is an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the Internet 26, or between the second display and the Internet, may also take place through means besides the local network 16. For example, the second display may communicate with the content playback device 12 through a separate mobile network.

The one or more second displays each bear a processor and components necessary to operate an application for service provider and content selection. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on various memories to undertake present principles. The second display 14i can receive user input signals from various input devices including a point-and-click device such as a mouse, a keypad, a touch screen, a remote control, etc. A network interface such as a wired or wireless modem communicates with the processor to provide connectivity to wide area networks such as the Internet 26 as noted above.

The servers, e.g., the management server 40 and content server 22, have respective processors accessing respective computer-readable storage media which may be, without limitation, disk-based and/or solid state storage. The servers communicate with a wide area network such as the Internet 26 via respective network interfaces. The servers may mutually communicate via the Internet 26. In some implementations, two or more of the servers may be located on the same local network, in which case they may communicate with each other through the local network without accessing the Internet.

It is noted that the various modules discussed above with respect to, e.g., the servers, may be implemented in a number of ways. In some cases, module functions may overlap, or module functions may be shared between servers or between a content playback device or second display and a server. Other module functions will also be understood.

Moreover, any module described may generally be represented by one or more physical memories, and such memories are generally addressable by physical or logical addresses. Suitable computing environments may also be implemented as part of cloud architectures.

Systems and methods have been disclosed that allow improvement of the user experience of the IPTV without adding to the hardware costs of the unit. As disclosed above, users may employ the system and method to receive streamed and video-on-demand content. Systems and methods according to the principles described here provide a methodology and protocol for a service provider to specify streaming content, e.g., live streaming content, and to allow a content playback device to access, obtain, and play the same. In this way, the service provider is enabled to integrate streaming content into an existing management server ecosystem in a convenient fashion. Moreover, the systems and methods described provide specifications for IPTV devices to reliably obtain and play live streaming audiovisual content without significant, or any, modifications.

Figure 11:
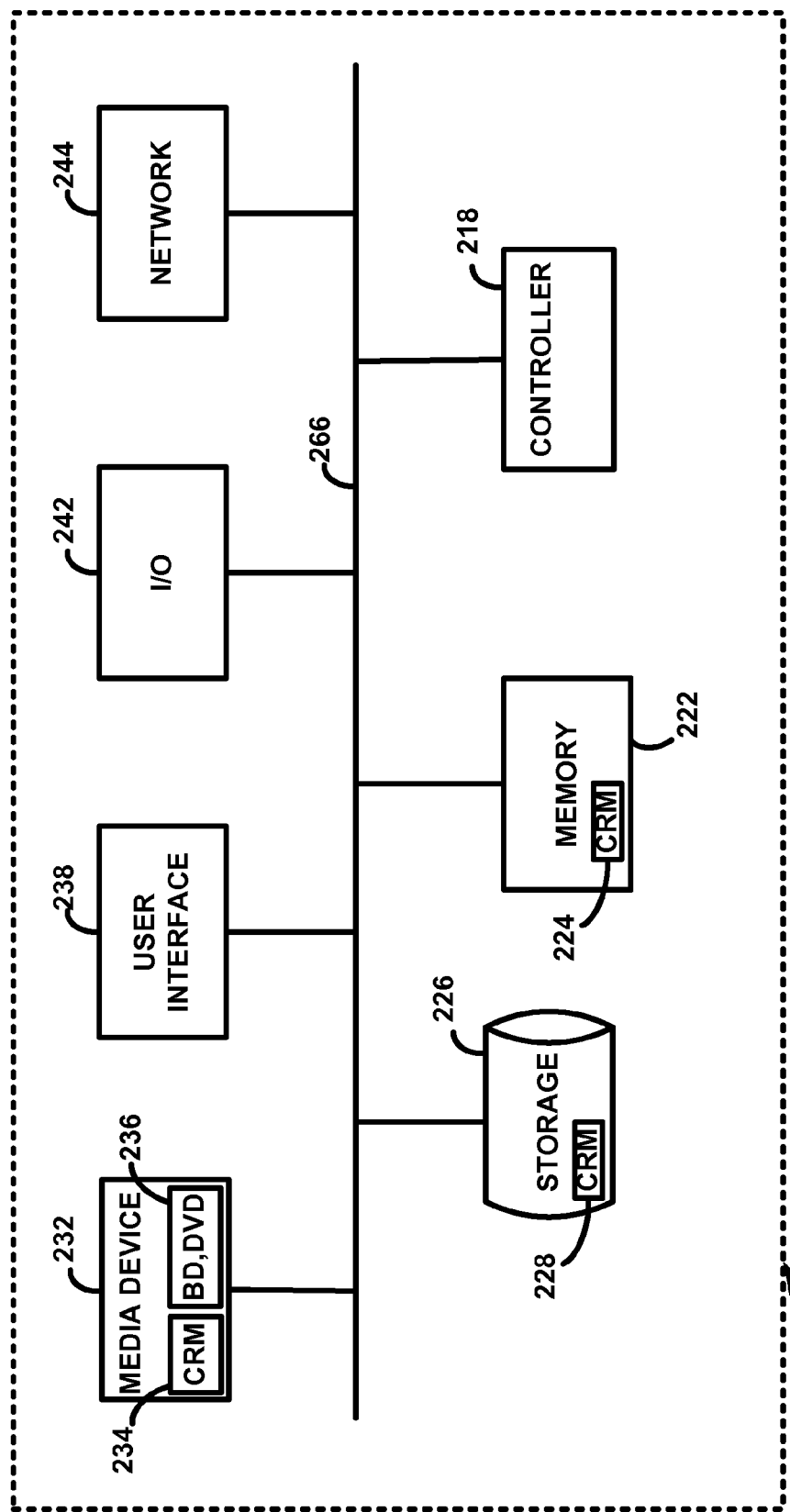

One implementation includes one or more programmable processors and corresponding computing system components to store and execute computer instructions, such as to execute the code that provides the various server functionality, e.g., that of the management server 18 or content server 22. Referring to FIG. 11, a representation of an exemplary computing environment 140 for a server, second display or other such computing devices is illustrated.

The computing environment includes a controller 218, a memory 222, storage 226, a media device 232, a user interface 238, an input/output (I/O) interface 242, and a network interface 244. The components are interconnected by a common bus 266. Alternatively, different connection configurations can be used, such as a star pattern with the controller at the center.

The controller 218 includes a programmable processor and controls the operation of the servers and their components. The controller 218 loads instructions from the memory 222 or an embedded controller memory (not shown) and executes these instructions to control the system.

Memory 222, which may include non-transitory computer-readable memory 224, stores data temporarily for use by the other components of the system. In one implementation, the memory 222 is implemented as DRAM. In other implementations, the memory 222 also includes long-term or permanent memory, such as flash memory and/or ROM.

Storage 226, which may include non-transitory computer-readable memory 228, stores data temporarily or long-term for use by other components of the servers, such as for storing data used by the system. In one implementation, the storage 226 is a hard disc drive or a solid state drive.

The media device 232, which may include non-transitory computer-readable memory 234, receives removable media and reads and/or writes data to the inserted media. In one implementation, the media device 232 is an optical disc drive or disc burner, e.g., a writable Blu-ray® disc drive 236.

The user interface 238 includes components for accepting user input, e.g., the user indications of streaming content item, and presenting service lists, asset categories, and assets to the user. In one implementation, the user interface 238 includes a keyboard, a mouse, audio speakers, and a display. The controller 218 uses input from the user to adjust the operation of the servers.

The I/O interface 242 includes one or more I/O ports to connect to corresponding I/O devices, such as external storage or supplemental devices, e.g., a printer or a PDA. In one implementation, the ports of the I/O interface 242 include ports such as: USB ports, PCMCIA ports, serial ports, and/or parallel ports. In another implementation, the I/O interface 242 includes a wireless interface for wireless communication with external devices. These I/O interfaces may be employed to connect to one or more content playback devices.

The network interface 244 allows connections with the local network and optionally with content playback device 12 and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The servers and the second displays may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, while the systems and methods have been disclosed with respect to service and asset choices made by a client device, i.e., a content playback device, e.g., an IPTV, it will be understood that such service and asset choices may also be made by a second display presenting appropriate authentication credentials to a management server, as disclosed in assignee's co-pending US patent applications incorporated by reference above, owned by the assignee of the present application and herein incorporated by reference in their entireties. Moreover, while URIs have been discussed as ways to access streaming and video-on-demand content from service providers or content delivery networks, it will be understood that the URL subset of URIs will often be that which is returned to clients for access.

Accordingly, the present invention is not limited to only those implementations described above.

The invention claimed is:

1. A method to enable streaming on an existing management server infrastructure, the management server infrastructure in data communication with a service provider and a client device, comprising:
    receiving metadata about streaming assets available from a plurality of service providers;
    integrating the metadata about the streaming assets into an asset specification of a management server infrastructure, the management server infrastructure including a management server assets list and asset information APIs;
    receiving a login and authentication request from a client device having authentication credentials, the request further including an indication that the device can support streaming;
    upon successful authentication, transmitting a user token to the device and providing a list of service providers, from the plurality, or an assets list, to the device;
    such that upon a request from the device for a streaming asset from a service provider, the client device transmits the user token to the service provider associated with the streaming asset and receives a URI to an index file, the index file corresponding to the requested streaming asset.

2. The method of claim 1, further comprising delivering a media encoder and segmenting module to the service provider or content delivery network.

3. The method of claim 1, wherein the authentication credential is associated with a user account, and further comprising delivering an advertisement to the device, a choice of advertisement at least partially based on data in the user account.

4. The method of claim 1, wherein the authentication credential is associated with a user account, and further comprising delivering a recommendation of an additional content item to the device, the recommendation at least partially based on data in the user account.

5. The method of claim 1, further comprising determining if a content playback device is operating in a malicious manner by determining if multiple occurrences of the receiving a request for content have occurred more than a predetermined number of times in a predetermined time period.

6. The method of claim 1, wherein the providing a URI includes providing a proxy URI to the content playback device, the proxy URI convertible to an actual URI only at the content delivery network, such that the actual location of a URI file is hidden to the content playback device.

7. The method of claim 1, further comprising receiving data about a technical capability of the content playback device, the technical capability at least including whether the content playback device is able to support streaming, and filtering the service list based on the technical ability.

8. A non-transitory computer-readable medium, comprising instructions for causing a computing device to implement the method of claim 1.

9. The method of claim 1, further comprising providing at least one definition to an API response to the service provider to associate with a streaming asset, the API response associated with an API call from a management server, the definition corresponding to a source, a protocol, and a metafile type, wherein the source contains a URI to an index file.

10. The method of claim 1, wherein the assets list is provided by the management server.

11. The method of claim 1, wherein the assets list is provided by the service provider.

12. The method of claim 1, wherein the request from the device is to the service provider, and the service provider transmits the URI to the device.

13. The method of claim 1, wherein the request from the device is to the management server, and the management server transmits the URI to the device.

14. A system for streaming on an existing management server infrastructure, including a management module, implemented on one or more servers, and coupled to a content playback device and a plurality of service providers, the management module comprises:
   a. a service module and an asset module, the service module configured to store information about a plurality of service providers and the asset module configured to store metadata about streaming assets available from the plurality of service providers;
   b. a service manager module, the service manager module for receiving a login request from the content playback device and for establishing a session upon successful authentication, the session including transmitting at least one technical specification of the content playback device to the service manager module, the technical specification used by the service manager module to determine if the content playback device supports streaming, the service manager module further for transmitting a user token to the content playback device upon successful authentication, the user token for transmission to a service for requesting a streaming asset;
   c. a service module for providing a list of services to the content playback device upon receipt of a service list request from the content playback device, the service module further for receiving a selection of a service from the list from the content playback device; and
   d. an index file module for providing a URI of an index file to the content playback device, the index file corresponding to the service selected on the content playback device, the URI allowing the content playback device to access an index file of a streaming asset from a service provider or content delivery network upon receipt of a call from the content playback device, the call at least indicating a streaming metafile type and a streaming protocol.

15. The system of claim 14, further comprising an advertising module, the advertising module for providing advertising to the content playback device at least partially based on data associated with a user account associated with the content playback device.

16. The system of claim 14, further comprising a recommendation module, the recommendation module for providing recommendations of content items to the content playback device at least partially based on data associated with a user account associated with the content playback device.

17. The system of claim 14, wherein the asset module is configured to provide an asset list corresponding to the service selected on the content playback device, the asset module further being configured to receive a selection of an asset from the list from the content playback device, and wherein the URI of an index file provided to the content playback device is a URI of an index file corresponding to the selected asset.

18. The system of claim 14, further comprising a media encoder and segmenter module, the media encoder and segmenter module for receiving media from a content source and encoding and segmenting the media such that the media is represented by an index file and a plurality of transport stream files.

19. The system of claim 18, further comprising a media encoder and segmenter provisioning module for providing the media encoder and segmenter module to a service provider or content delivery network.

20. The system of claim 14, further comprising a filter module to filter the provided service list based on the technical specification of the content playback device, the technical specification at least including an ability of the content playback device to support streaming content.

21. The system of claim 14, further comprising a proxy module, the proxy module communicating with the content delivery network or service provider such that the index file module provides a proxy URI to the content playback device, the proxy URI convertible to an actual URI by the content delivery network or service provider when received from the content playback device.

22. The system of claim 14, further comprising a denial of service module, the denial of service module detecting if a number of attempts have been made to access the provided URI greater than a predetermined threshold number within a predetermined period of time.

23. A method for making streaming content from a service provider available to a content playback device using an existing management server infrastructure, comprising:
   a. at a service provider, the service provider providing access to streaming assets, for an asset provided or to-be-provided for streaming, providing at least one definition to an API response, the API response associated with an API call from a management server, the definition corresponding to a source, a protocol, and a metafile type, wherein the source contains a URI to an index file;
   b. in a response to a request for a streamed asset from a content playback device, determining if the content playback device supports streaming; and
   c. if the content playback device is determined to support streaming, returning data sufficient to enable the content playback device to make a call to the URI to retrieve the asset to be played, the call at least indicating a streaming metafile type and a streaming protocol.

24. The method of claim 23, wherein the determining if the content playback device supports streaming includes receiving a TV_ID from the content playback device during an authentication procedure.

25. The method of claim 23, wherein the protocol is an HTTP protocol and wherein the metafile type is M3U8.

26. The method of claim 23, wherein the data is returned following receipt of an apiContents API call or apiInformation API call from the management server.

27. A non-transitory computer-readable medium, comprising instructions for causing a computing device to implement the method of claim 23.

* * * * *